March 13, 1956     H. M. ARNESON ET AL     2,738,492
SIGNAL LIGHT FOR AUTOMOTIVE VEHICLES
Filed Feb. 18, 1952     2 Sheets-Sheet 1
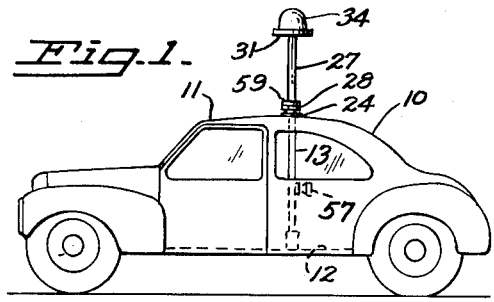
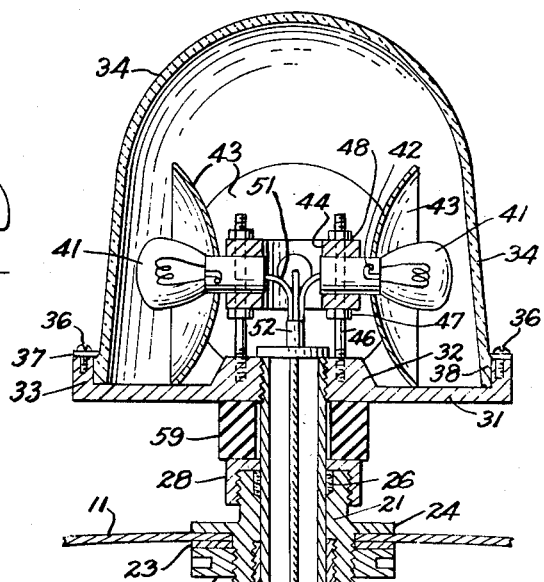
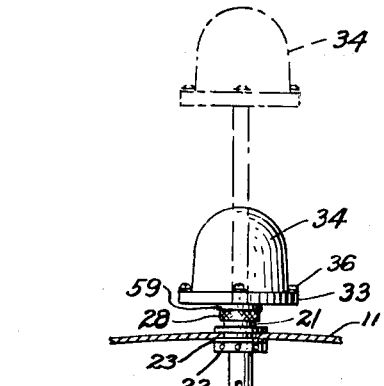
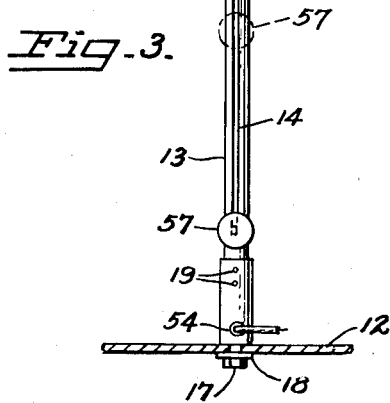
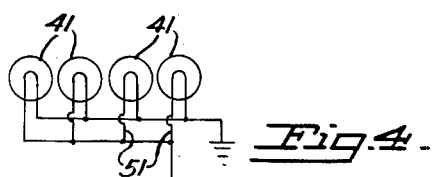
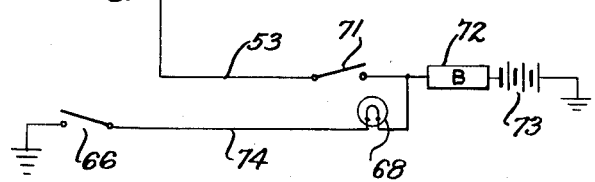
INVENTORS
HOWARD M. ARNESON
JACK J. McDONALD
BY Townsend and Townsend
ATTORNEYS March 13, 1956  H. M. ARNESON ET AL  2,738,492
SIGNAL LIGHT FOR AUTOMOTIVE VEHICLES
Filed Feb. 18, 1952  2 Sheets-Sheet 2
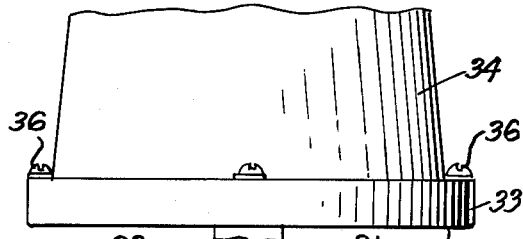
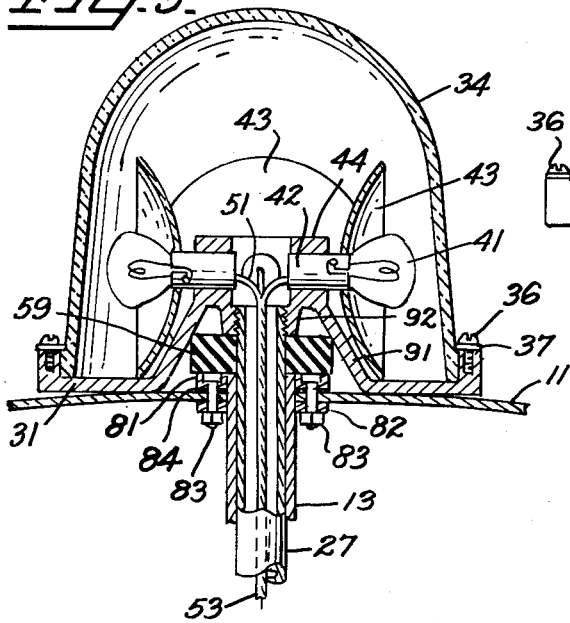
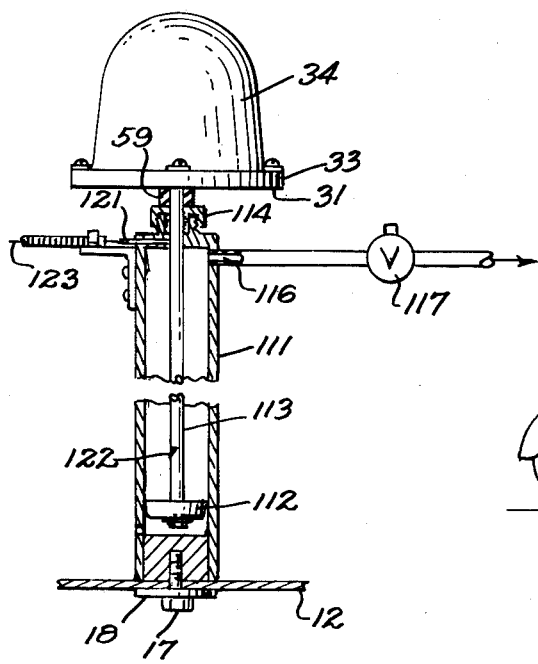
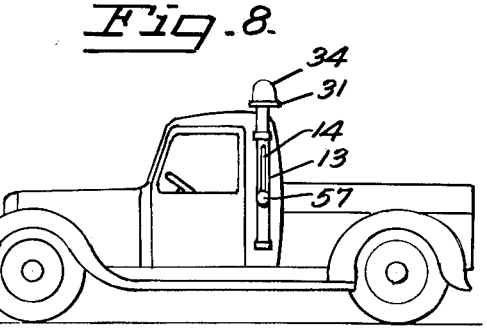
INVENTORS
HOWARD M. ARNESON
JACK J. McDONALD
BY
Townsend and Townsend
ATTORNEYS

United States Patent Office 2,738,492
Patented Mar. 13, 1956

2,738,492

SIGNAL LIGHT FOR AUTOMOTIVE VEHICLES

Howard M. Arneson and Jack J. McDonald, Vallejo, Calif., assignors to M & A Manufacturing Co., Vallejo, Calif., a corporation of California Application February 18, 1952, Serial No. 272,232

4 Claims. (Cl. 340—87)

This invention relates to new and useful improvements in warning signals and more particularly to a warning light mounted on a vehicle. The invention has particular application installed on police cars, fire engines, ambulances and various other emergency vehicles on which it is desirable to have a light visible as a warning of danger.

This invention concerns a signal light mounted in such manner that it may be elevated to a considerable height so that it may be seen from a distance and, further, so that it may be seen when other vehicles are between the observer and the vehicle carrying the warning light. The provision of a signal which may be elevated reduces the number of signal lights necessary for proper protection of emergency vehicles. For example, an ordinary police car has one or more lights mounted on the front of the car which are visible to observers in front of the car, one or more additional lights on the rear of the car which are visible to the rear, and oftentimes a light on the top of the car which is visible for a limited distance and only when no vehicle intervenes between the car and the observer. The present signal light, when elevated, is visible at a greater distance. It is visible from the front, rear or side, and the view is not obstructed by any object which might normally intervene between the emergency vehicle and the observer.

It will be understood that the elevated signal is retractable and thus may be lowered when the overhead clearance is impaired, as for example, when the vehicle is stored in a garage, when passing through an underpass or the like.

One of the features of the present invention is the fact that the signal lamp may be extended and retracted rapidly with little effort. A warning light may be incorporated in the electric circuit hereinafter described so that the operator of the vehicle may know that the signal light is extended.

Another feature of the invention is that the standard which supports the warning light may be adjusted for use in a wide variety of different vehicles.

Other objects of the present invention will become apparent upon reading the following specification and referring to the accompanying drawings in which similar characters of reference represent corresponding parts in each of the several views.

Fig. 1 is a schematic side elevation showing the invention installed in a passenger automobile.

Fig. 2 is a vertical section through the signal light and supporting structure.

Fig. 3 is a side elevation of the signal light and supporting structure showing in solid lines the signal in retracted position and in dotted lines the signal in extended position.

Fig. 4 is a wiring diagram of the electrical circuits employed.

Fig. 5 is a vertical section through a modified signal light and the top of the supporting structure therefor.

Fig. 6 is a side elevation, partially in section, of a further modification of the invention.

Fig. 7 is a side elevation, partially in section, of still another modification.

Fig. 8 is a side elevation showing the invention installed on the exterior of a vehicle.

In Fig. 1 of the accompanying drawings there is shown a motor vehicle 10 which is illustrated as an enclosed passenger car having a roof 11 and floor 12 of the passenger compartment. Where a passenger vehicle having front and rear seats is employed, it is desirable that the supporting structure for the signal be installed immediately behind the front seat so that the means for raising and lowering the signal may be readily accessible to the operator of the vehicle without impairing the full utilization of the vehicle. When located in such position, it will be found that the supporting structure may extend through the opening in the upholstery which is frequently formed where a dome-light is positioned in the ceiling of the vehicle.

The supporting structure for the signal employs a vertically disposed tubular stanchion 13 which extends from adjacent the floor to the ceiling of the vehicle. Said stanchion has an extended vertical slot 14, for a purpose hereinafter described, said slot having a length equal approximately the maximum distance which the signal lamp may be elevated. The lower end of the stanchion 13 is held in bracket 16 in which the lower end of said stanchion is received. Said bracket comprises a hollow tube having a diameter slightly larger than the outer diameter of stanchion 13 and a solid bottom. A bolt 17 passes up through a hole in floor 12 and is received in a tapped hole in said solid bottom of said bracket 16. An enlarged washer 18 is placed between the head of bolt 17 and the underside of floor 12. A plurality of set screws 19 passing through bracket 16 and bearing against stanchion 13 prevent rotation of said stanchion and also lock said stanchion against vertical movement within said bracket 16. The upper end of stanchion 13 is held by fitting 21 which passes through a hole in the roof of the vehicle, the lower end of fitting 21 having a threaded hole receiving the threaded upper end of stanchion 13. An enlarged nut 22 is threaded on the threaded exterior of the lower end of fitting 21, said nut bearing against a fiber washer 23 positioned between nut 22 and roof 11. By tightening nut 22 a seal is formed to prevent water from entering the interior of the vehicle from the hole in the roof. It will be understood that fitting 21 has an enlarged flange 24 which bears against the top of the vehicle and prevents distortion thereof when nut 22 is tightened. A packing gland 26 is formed in the top of fitting 21, said gland and the packing received therein bearing against tube 27 which fits with a sliding fit within hollow stanchion 13. Packing gland 26 prevents water from entering through the top of fitting 21 in the space between tube 27 and said fitting 21. Cap 28 is threaded over the exterior of the upper end of fitting 21, said cap serving to compress the packing in gland 26 to seal against tube 27 without binding against vertical movement.

The upper end of tube 27 is threadedly connected to base 31 of the signal, said base being a circular disc having an enlarged hub 32 and a peripheral up-turned flange 33. A glass or plastic dome 34 fits on top of base 31 and inside flange 33, being held against dislodgment by screws 36 which are threaded into the top edge of flange 33, there being washers 37 which restrain the top edge of an enlarged bead 38 on the bottom edge of dome 34. It will be understood that dome 34 is preferably red or some other distinguishable color indicating warning to observers. Inside dome 34 is a plurality of incandescent bulbs 41, there being shown in the accompanying drawings four bulbs 41 horizontally disposed with their axes 90° apart. Each said bulb 41 is received in a sleeve socket 42 having a bayonet slot connection or other conventional means. A parabolic reflector 43 may be installed in association with bulb 41 to direct the illumination in the proper direction. Each socket 42 is held in a nonconductive annular ring 44 having a vertical axis. Ring 44 may be adjusted in elevation, this being accomplished by mounting said ring on vertical studs 46 threaded into hub 32, with nuts 47 and 48 threaded on said studs 46 at the underside and top surface of said ring 44, respectively. By raising and lowering nuts 47 and 48 the elevation of ring 44, and with it the elevation of bulbs 41, may be accurately adjusted.

The lead wires 51 for said lamps 41 are spliced together at a convenient location within ring 44 and pass through fitting 52 which closes off the top end of tube 27, a common lead wire 53 passing down inside tube 27 through the bottom end thereof and likewise through the bottom end of stanchion 13 and thence out through a hole in bracket 16 adjacent the bottom thereof, there being a fiber bushing 54 in the hole in bracket 16 through which wire 53 passes. Wire 53 may be extended under the floor mat up through the front compartment of the vehicle to a connection on the back of the dash board.

In order to raise and lower the signal, a pin 56 fixed to tube 27 passes outwardly through slot 14 in stanchion 13, the outer end of said pin being in threaded engagement with knob 57. A fitting 58 is provided, said fitting having an inner arcuate surface which bears against stanchion 13 and a front outer surface against which knob 57 bears. Thus, when knob 57 is loose, tube 27 may be slid vertically within stanchion 13, thereby elevating or lowering the signal. When knob 57 is tightened, fitting 58 bears against stanchion 13 and locks tube 27 and the signal relative to stanchion 13 and vehicle 10. A resilient snubber 59 is positioned, encircling tube 27 between cap 38 and disc 31, said snubber cushioning the signal when the same is lowered and preventing damage to the signal, globe 34, bulbs 41 or roof 11. To prevent removal of knob 57, pin 56 is necked in midway of its length as indicated by reference numeral 61 and a pin 62 is driven through the shank of knob 57 at said reduced portion 61.

A limit switch 66 is mounted on bracket 16, the contact element 67 of said switch passing through a hole in stanchion 13. The lower end of tube 27 is arranged to bear against said contact element 67 when, and only when, said tube is in fully retracted position. When tube 27 is in retracted position, switch 66 is open and when said tube 27 is extended, the contacting switch is closed, thereby illuminating lamp 68 on the dash board of the vehicle. Said lamp 68 serves as a warning to the operator that the signal is extended and thus alerts the operator to lower the signal when overhead clearance is impaired.

The electrical circuit for illumination of lamps 41 involves grounding the leads from one terminal of each lamp, the opposite lead wire 53 being coiled in a helical coil inside tube 27 with a helical spring embedded in the insulation so that as tube 27 is extended and retracted, wire 53 is maintained coiled within tube 27 and does not interfere with raising and lowering of the signal. Wire 53 leads to switch 71 located at a convenient place in the vehicle such as the dash board, said switch being closed to illuminate lamps 41 and being open when it is not desired to illuminate said lamps 41. It is generally desirable to employ a blinker 72 in series with lamps 41, said blinker being shown in Fig. 4 in series with storage battery 73. The same blinker 72 is used in connection with warning lamp 68 which is illuminated when switch 66 is closed when tube 27 is extended.

In operation, assuming that the signal is in lowered position, the operator loosens knob 57 and then manually raises knob 57 until the signal is extended and thereupon tightens knob 57 so that fitting 58 bears against stanchion 13 and locks the signal in extended position. At any time that the signal is in extended position, lamp 68 located on the dash board is illuminated. Lamps 41 may be illuminated when necessary by closing switch 71.

When the overhead clearance is impaired, as when the automobile has returned to the garage, knob 57 is loosened and the signal is lowered, snubber 59 serving to cushion the shock of lowering. When the signal is completely lowered, switch 66 is opened and lamp 68 extinguished.

It will be observed that initial installation of the mounting for the signal is readily accomplished with little or no permanent damage to the vehicle and thus the resale value of the vehicle is not impaired. If the signal is installed in a sedan, it is merely necessary to drill a hole in the floor for passage of bolt 17 and to drill a hole in the roof for fitting 21, fitting 21 ordinarily passing through the opening in the upholstery of the ceiling in the position of the normal dome light of the automobile. After the proper holes have been made in the floor and body of the car, stanchion 13 slips into bracket 16. Bracket 16 is fixed to the floor of the car by means of bolt 17. Thereupon the upper end of stanchion 13 is attached to fitting 21 and nut 22 is tightened so that the roof of the car is clamped between flange 24 and washer 23. Stanchion 13 is then fixed with respect to bracket 16 by tightening screws 19. Cap 28 is tightened to assert the proper pressure against tubing 27 so that the tubing may be raised and lowered easily but without water leaking through packing gland 26. The installation of the electrical circuit is readily accomplished in that lead wires 53 and 74 which lead from lamps 41 and switch 66, respectively, pass under the floor covering of the automobile to the dash board. The other minor details in connection with installation of the apparatus and the electrical circuit involved therein would be readily apparent to those skilled in the art.

An alternative means of mounting the signal light and supporting structure is shown in Fig. 8. In this modification it will be seen that the stanchion 13 is located on the side toward the rear of the cab of a truck such as an emergency tow truck. Said stanchion is slotted by means of slot 14, and knob 57, which is attached to the interior tube 27, may be used to raise and lower said tube. The disc 31 on which is mounted globe 34 encloses the lamps 41.

A modified means of supporting the device from the roof of the car is shown in Fig. 5. The upper end of stanchion 13 projects through a hole in the roof of the car and to said upper end of the car is welded a circular apertured disc 81. A complementary, apertured circular disc 82 which fits around stanchion 13 is positioned on the underside of the roof of the car. A plurality of bolts 83 are used to draw discs 81 and 82 tight against the roof of the car, there preferably being a fiber gasket 84 beneath disc 81 to make a water-tight seal around the holes in roof 11.

As also shown in Fig. 5, disc 31 which supports dome 34 is formed with a concavity 91 in its bottom surface. The diameter and position of said concavity 91 is such that when the signal is in lowered position, as shown in Fig. 5, snubber 59 and disc 81 fit within said concavity so that the signal may be lowered as close to roof 12 as possible. In this modification the upper end of tube 27 is threaded into a downwardly projecting boss 92 formed on ring 44 providing the mounting for sockets 42 for lamps 41. The means for raising and lowering tube 27 within stanchion 13 may be that heretofore described or one of the modifications hereinafter described.

In the modification shown in Figs. 1 to 3 inclusive, the signal is raised by manually lifting knob 57. In Fig. 6 an alternative construction is illustrated employing a reversible electric motor. Said electric motor 101 is mounted on floor 12 with its shaft vertical, and the lower end of stanchion 13 is fixed to the top of said motor. An elongated screw 102 vertically disposed inside tube 27 is rotated by said motor 101. At the lower end of said tube 27 is a nut 103 fixed to said tube 27, said nut 103 being in threaded engagement with screw 102. The upper end of screw 102 is guided by bearing 104 inside tube 27 through which screw 102 projects. Any convenient means for preventing rotation of tube 27 within stanchion 13 may be employed such as milling a flat surface (indicated by reference numeral 106) on the side of tube 27 and positioning a key 107 in stanchion 13 which prevents rotation of member 27. It will be seen from this arrangement, that as motor 101 is revolved, tube 27 is raised and lowered depending upon direction of the rotation of the motor. In this modification, lead wire 53 preferably extends through apertures in bearing 104 and nut 103 and is held straight by means of a conventional spring biased reel 108 on the exterior of stanchion 13. A switch (not shown) may be mounted on a convenient location, such as the dash board, said switch controlling the rotation of motor 101.

In Fig. 7 pneumatic means for raising and lowering the signal is shown. In this modification, stanchion 13 is replaced by a vertically disposed pneumatic cylinder 111 which is mounted on the floor 12 of the vehicle by means of bolt 17. Within cylinder 111 is a piston 112 connected to vertically disposed piston rod 113 which extends out through the top of cylinder 111 through packing gland 114. Disc 31 is mounted on the top end of rod 113, said disc carrying globe 34 within which the warning lights are disposed. A vacuum inlet port 116 in the top end of cylinder 111 is connected to a source of vacuum such as the intake manifold of the vehicle, and a valve 117 is located in the vacuum line at an accessible point to connect cylinder 111 with the source of vacuum or vent the upper end of cylinder 111 to the atmosphere when it is desired to lower the signal.

A spring pressed latch 121 may be disposed to engage a notch 122 near the lower end of rod 113 to lock the signal in up position, said spring pressed latch 121 being released by means of a conventional flexible cable 123 leading to an accessible location such as the dash board of the vehicle adjacent valve 117. It will be seen that when it is desired to raise the signal shown in the modification of Fig. 7, the operator adjusts valve 117 to draw a vacuum in cylinder 111. When the signal is in up position latch 121 engages notch 122 and holds the signal in extended position. Thereupon, valve 117 may be adjusted to vent cylinder 111. When it is desired to lower the signal, latch 121 is released by means of cable 123.

Although we have described our invention in some detail by way of illustration and example for purposes of clarity of understanding, it is understood that certain changes and modifications may be practiced within the spirit of the invention and scope of the appended claims.

We claim:

1. An extensible warning signal for mounting on a closed vehicle having an apertured roof comprising a hollow stanchion extending from adjacent the vehicle floor to adjacent the roof of said vehicle, said stanchion being apertured with an elongated longitudinal slot, means for mounting said stanchion on said floor, a tube slidable within said stanchion and extending through the aperture in said roof, a knob connected to said tube through said slot in said stanchion, said knob being operable to raise and lower said tube within said stanchion, a plate fixed to said stanchion on the exterior of said roof, said plate being apertured for the projection of said tube therethrough, means fastening said plate and said roof together, a snubber above said plate, a support base mounted on the upper end of said tube, said support base being dished concave upwardly to receive said plate and said snubber when said tube is in retracted position, said snubber being positioned and dimensioned to cushion said support base when said tube is in retracted position, a lamp mounted on said support base, and a lead wire connecting said lamp to a source of electric current.

2. An extensible warning signal for mounting on a closed vehicle having an apertured roof comprising a hollow stanchion extending from adjacent the vehicle floor to adjacent the roof, means for mounting said stanchion on said floor, a movable member movable within said stanchion and extending through the aperture in said roof, a plate fixed to said stanchion on the exterior of said roof, said plate being apertured for the projection of said movable member therethrough, an apertured disc surrounding said stanchion beneath said roof, means fastening said plate and said disc together, a support base mounted on the upper end of said movable member, said support base being dished concave upwardly to receive said plate when said movable member is in retracted position, means for raising and lowering said movable member within said stanchion, means controllable by the operator and located remote from said stanchion for actuating said last named means, a lamp mounted on said support base, and a lead wire connecting said lamp to a source of electric current, said lead wire extending within said stanchion.

3. A warning signal comprising a downwardly concave, substantially circular support having a flat bottom edge and a peripheral upturned rim, a central ring on the top of said support, said ring being apertured in a plurality of bores parallel to said bottom edge, means for mounting an electric light bulb in each of said bores, a plurality of reflectors mounted on said central ring and apertured for reception of light bulbs in registry with said bores, a source of electric current for illuminating bulbs in said mounting means, a hemispherical, transparent globe fitting inside said rim and enclosing said ring and reflectors, said globe having a peripheral bead on its bottom edge, and means for detachably engaging said bead of said globe on said support.

4. A warning signal according to claim 3 in which there are four bores, four lamps and four reflectors directed radially outward and angularly spaced 90°, all of said lamps being illuminated from a single source.

References Cited in the file of this patent

UNITED STATES PATENTS

| 734,875 | Hubbell | July 28, 1903 |
| 1,048,702 | Johnson | Dec. 31, 1912 |
| 1,202,696 | Fernandez | Oct. 24, 1916 |
| 1,303,147 | Johnson | May 6, 1919 |
| 1,486,410 | Bagnall | Mar. 11, 1924 |
| 1,800,078 | Johnson | Apr. 7, 1931 |
| 1,927,319 | Michel | Sept. 19, 1933 |
| 2,183,349 | Fukuhara | Dec. 12, 1939 |